United States Patent Office.

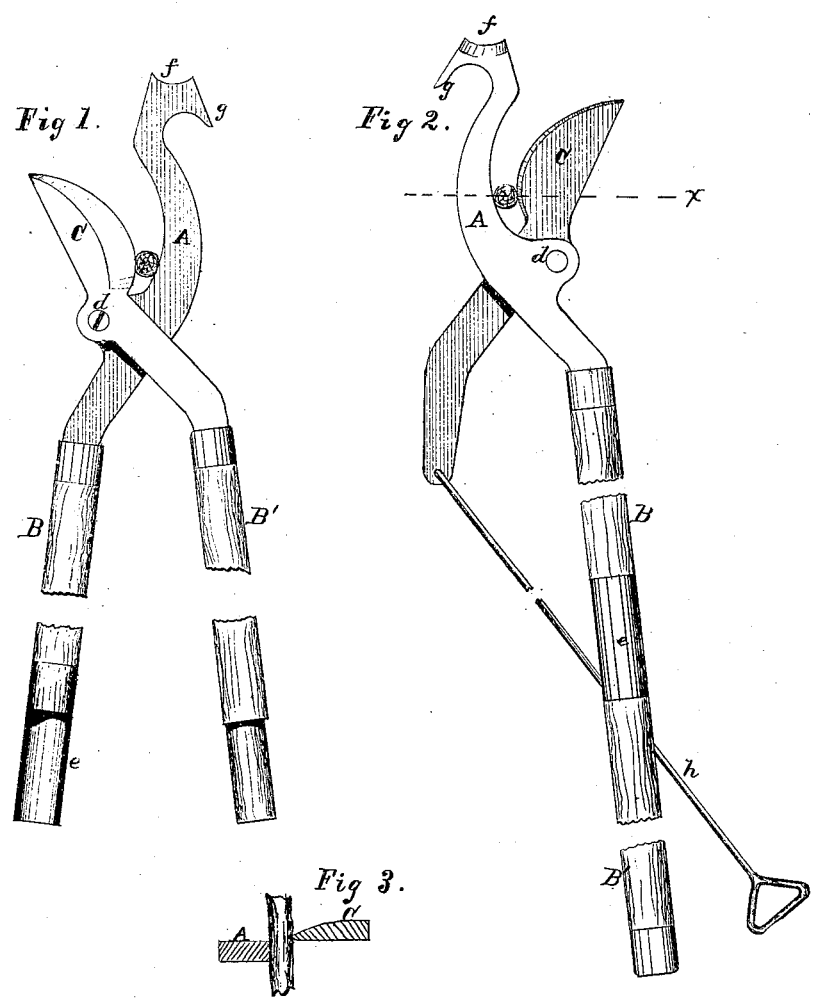

P. R. WALSH AND G. C. EATON, OF ROCHESTER, NEW YORK.

Letters Patent No. 99,038, dated January 18, 1870.

IMPROVEMENT IN PRUNING-SHEARS.

The Schedule referred to in these Letters Patent and making part of the same.

*To all whom it may concern:*

Be it known that we, P. R. WALSH and G. C. EATON, of Rochester, in the county of Monroe, and State of New York, have invented certain new and useful Improvements in Pruning-Shears; and we do hereby declare that the following is a full, clear, and exact description thereof, reference being had to the accompanying drawings, making part of this specification, in which—

Figure 1 is a side elevation of our invention.
Figure 2 is an obverse view.
Figure 3 is a transverse section at the dotted line $x$, fig. 2.

The object and nature of our invention will be understood by reference to the drawings and specification; and to enable others to make and use the same, we will describe its construction.

The cutting-edge of the knife C of our pruning-shears has a convex outline, and the inner edge of the cutting-bar A has a concave outline, nearly corresponding to it, as shown.

The pivot $d$ is located considerably out of the central line of cut, by means of which, and the fulness of the knife at the heel, the latter has a drawing-cut upon the cutting-bar A. The limb to be cut is prevented from being pushed away from the knife, by the curve of the cutting-bar.

At the extremity of the latter, we provide the chisel $f$, its edge having a concave outline, and so formed as to cut with an upward thrust. The object of this is to enable the operator to sever twigs and small branches close to the main limbs and trunk of the tree, and without injury to the bark.

The side of the chisel $f$ may be extended and bent over, as shown, to form a hook, $g$, for the purpose of drawing out loose brush which may become entangled in the tree.

The handle B is rigidly secured to the shank of the cutting-bar, while B' is detachable from the knife-shank, and its outer extremity fitted to enter a socket, $e$, provided upon the end of B. By this means the operator is enabled to use the chisel and hoop in the tops of trees, and at the same time avoid the inconvenience of long handles when working lower down.

In fig. 2, we have shown a device by which we may use the extension-handle in connection with the shears.

The rod $h$, made of a suitable length, is bent at one end, and inserted in a hole in the knife-shank, and is provided with a finger-loop at the opposite end. By operating this at a slight angle with the extension-handle, as shown in fig. 2, branches of considerable diameter may be cut off, at an elevation corresponding to the length of the handles and the height of the operator.

It is obvious that where the knife C is bevelled wholly upon one side, as heretofore, it will be drawn over in its cut against the cutting-bar A, thereby soon dulling its edge.

In grinding our knives, we also bevel the inner face slightly, as shown in figs. 2 and 3, which entirely obviates this difficulty, as well as reduces the labor in effecting the cut.

We thus provide a very simple, cheap, and convenient pruning-tool, having but one wearing-joint, and answering all the requirements of such an implement.

What we claim as our invention, and desire to secure by Letters Patent, is—

1. The cutting-bar A, having chisel $f$ and hook $g$, arranged to operate substantially as set forth.

2. In combination with pruning-shears, substantially as set forth, the detachable sections B and B', when arranged to operate as described.

3. In combination with the extension-handle of the cutting-bar A of pruning-shears, the hand-rod $h$, as shown, and for the purposes set forth.

4. Pruning-shears, when composed of the knife C, cutter-bar A having hook $g$, chisel $f$, detachable sections B and B', and hand-rod $h$, all arranged to operate as set forth.

P. R. WALSH.
G. C. EATON.

Witnesses:
F. H. CLEMENT,
WM. S. LOUGHBOROUGH.